(No Model.) 2 Sheets—Sheet 2.
E. KUHN.
PHOTOGRAPHIC TIME SHUTTER.
No. 362,518. Patented May 10, 1887.
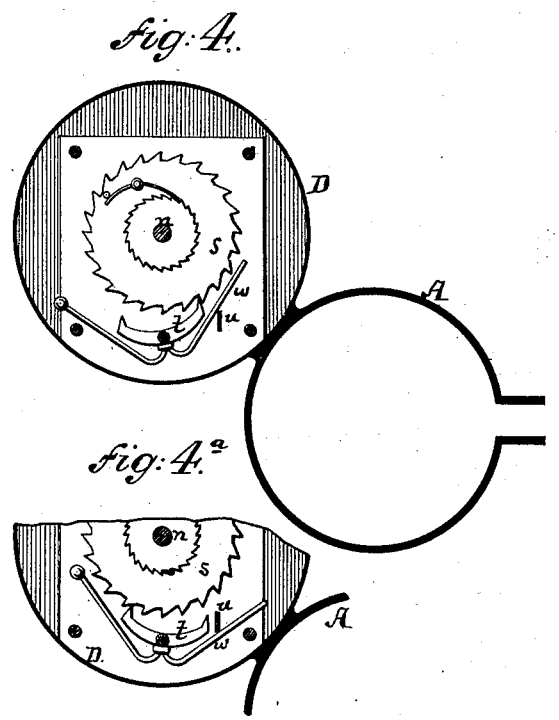
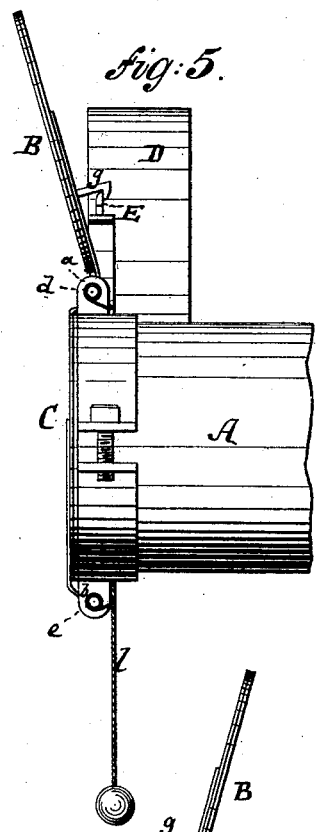
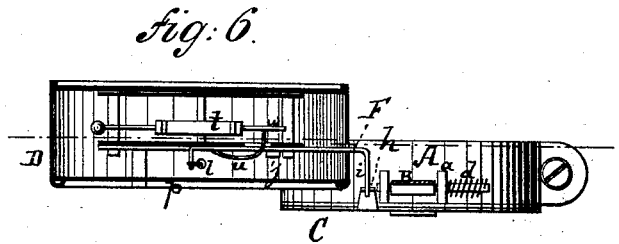
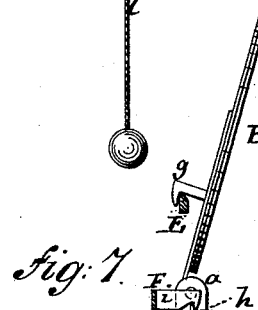
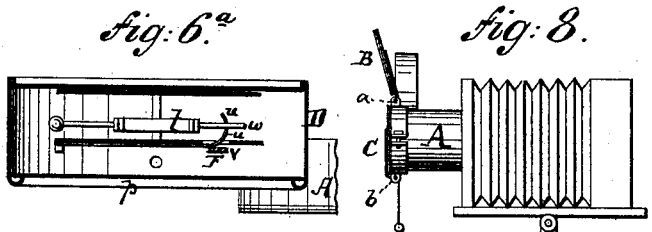
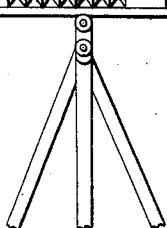
WITNESSES:
INVENTOR
Edmond Kuhn
BY
Briesen & Steele, his
ATTORNEYS

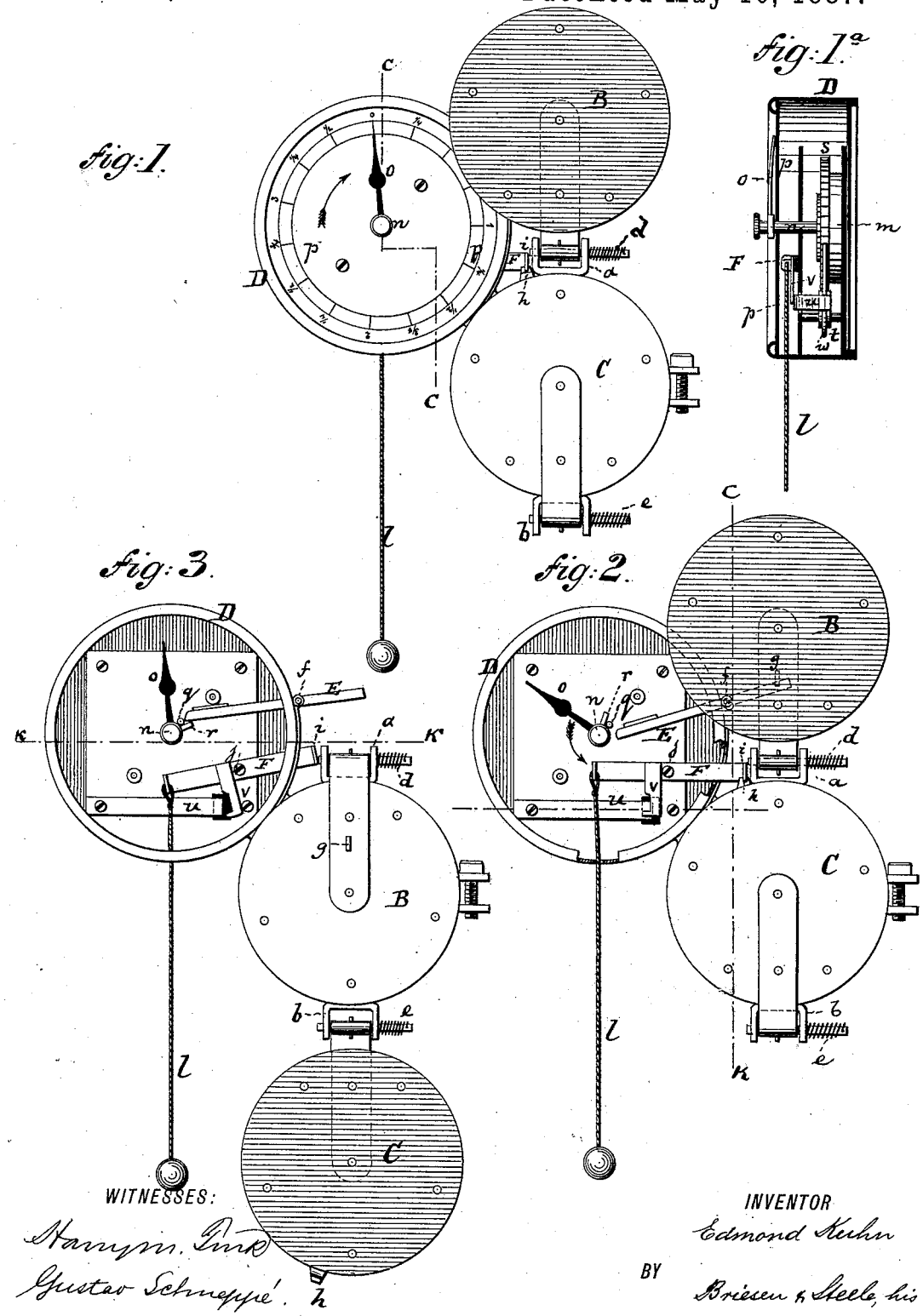

United States Patent Office.

EDMOND KUHN, OF BROOKLYN, NEW YORK.

PHOTOGRAPHIC TIME-SHUTTER.

SPECIFICATION forming part of Letters Patent No. 362,518, dated May 10, 1887.

Application filed June 29, 1886. Serial No. 206,601. (No model.)

*To all whom it may concern:*

Be it known that I, EDMOND KUHN, a resident of Brooklyn, in the county of Kings and State of New York, have invented an Improved Photographic Time-Shutter, of which the following is a full, clear, and exact description, reference being made to the accompanying drawings, in which—

Figure 1 is a face view of my improved photographic time-shutter. Fig. 1ª is a vertical section of the same on the line $c\ c$, Fig. 1. Fig. 2 is a face view of the same without the dial-plate, the hand or pointer being in a different position from that shown in Fig. 1. Fig. 3 is a face view of the same, showing the covers or flaps in a different position from what they are in Fig. 1. Fig. 4 is a detail face view, partly in section, of the frame of the apparatus, showing the escapement and ratchet wheel. Fig. 4ª is a similar view showing the escapement in a different position from that in which it is in Fig. 4. Fig. 5 is a side view of the apparatus. Fig. 6 is a horizontal section on the line $k\ k$, Fig. 3. Fig. 6ª is a horizontal section on the same plane as Fig. 6, but showing the escapement locked. Fig. 7 is a detail vertical section on the line $e\ k$, Fig. 2; and Fig. 8 is a side view of a photographic camera with my improvement thereon.

The object of this invention is to provide a photographic camera with means for automatically exposing the lens and object therein to the light for any desired length of time, and to relieve the operator of the burden of loosely estimating the time of exposure.

The invention consists, briefly stated, in combining such a camera with a pair of shutters or flaps and with mechanism for moving one of said flaps automatically, all as hereinafter described.

In the drawings, the letter A represents the tubular or other end of a camera, being the end nearest the subject to be photographed.

B and C are two shutters or flaps, which are hinged to lugs $a$ and $b$, respectively, that project from opposite sides of the tube A. The pivots of these flaps B and C are respectively provided with springs $d$ and $e$. The spring $d$ of the flap B is so constructed that it will have a tendency to throw the flap B over the end of the tube A, so as to exclude light from said tube. The spring $e$ of the flap or shutter C is so adjusted as to tend to throw said flap or shutter C away from the tube A; hence if the parts are left to themselves the upper flap or shutter, B, will be let down over the end of the tube A, as in Fig. 3, while the lower flap or shutter, C, will be swung below said tube A, as in the same figure. For greater convenience I will hereafter in this specification term the self-closing flap B the "upper flap" and the self-opening flap C the "lower flap," although of course either may be the upper or the lower.

To the tube A is rigidly attached a shell or case, D, to which is pivoted at $f$ a lever, E, which lever extends into the case D and projects also outside of said case, as is shown in Fig. 3. The upper flap, B, carries on its outer side a little hook, $g$, which, when hooked over the projecting end of the lever E, as in Fig. 5, will serve to hold said upper flap, B, open. The lower flap, C, has a projecting hook, $h$, which, when said flap is raised, as in Fig. 1, is engaged with a hook, $i$, on a lever, F, that is pivoted at $j$ in the case D. Thus by the lever E the lid B can be held open—that is, away from the tube A—and by the lever F the flap C can be held shut—that is, placed over the tube A—all as in Figs. 1, 2, and 8.

The lever F is connected with a cord or string, $l$. When this cord or string is pulled, the lever F will be disengaged from the shutter or flap C, whereupon the spring $e$ will throw said shutter or flap C open into the position shown in Fig. 3. The photographic apparatus in the camera will now be exposed to the light.

The object of my invention will be more clearly understood, after what has been stated, when it is remembered that the length of time of exposure will be regulated by clock-work, which affects the lever E and causes the same to become disengaged from the flap B at the proper time, whereupon said flap B will, under the influence of the spring $d$, be thrown shut over the end of the camera, as in Fig. 3.

My intention is to regulate by clock-work the time elapsing between the opening of the shutter C and the closing of the shutter B, and to do this with exactness and automatically, instead of leaving the operator, as heretofore, to guess at the time necessary for the exposure.

The case or shell D contains in a suitable barrel, $m$, a spring, which is adapted to turn a spindle, $n$, in the direction of the arrow shown in Fig. 2, whenever said spring is wound. The spindle $n$ has a projecting hand or pointer, $o$, in front of a dial, $p$, which dial closes the exposed end of the case or shell D. The spring in the barrel $m$ is substantially unwound whenever a lug, $r$, on the spindle $n$ bears against a fixed pin, $q$, as in Fig. 3. In the same position the lug $r$ is in contact with the inner end of the lever E, raising the same, so that it cannot hold the shutter B open.

The spindle $n$ carries an escapement-wheel, $s$, near which is pivoted in the case D an anchor or escapement, $t$, which anchor engages with the teeth of the escapement-wheel in the usual manner, to prevent too rapid rotation of the spindle when the spring is unwinding. When the pointer $o$ is taken from its normal position and turned by hand in the direction of the arrow, which is shown in Fig. 1, over the face of the graduated dial into a different position—say that shown in Fig. 2—it winds up the spring in the barrel $m$, so that when afterward the pointer is let go, said spring, unwinding, will carry the pointer back to said normal position, which is that indicated in Figs. 1 and 3.

In the case D is fastened a spring-blade, $u$, which, by an arm, $v$, of the lever F, can be crowded into engagement with a projection, $w$, of the escapement $t$, as in Figs. 4 and 4ª. Fig. 6ª shows the end of the spring-blade $u$ crowded by the projection $v$ into the way of the part $w$ of the escapement. Whenever this occurs the escapement cannot move. One of its teeth engages with the escapement-wheel and the escapement-wheel cannot turn. Consequently the spring in the barrel $m$ cannot unwind.

These being the parts which constitute the mechanism which I have described, their operation will be readily understood. The said operation is as follows: After the camera has been properly adjusted as to direction and distance from the object to be photographed, and before the negative is placed in the camera, the operator turns the pointer $o$ to that part of the dial which indicates the length of time the negative is to be exposed to the light. Thus, if the pointer $o$ is placed opposite the figure "3" on the dial, that would indicate that three seconds would be the period of exposure. With his finger still on the pointer $o$, the operator now closes the shutter C over the end of the tube A, and engages said shutter by its hook $h$ with the lever F. This action locks the shutter C and also the lever F, holding the latter in the position shown in Fig. 2, with its projecting arm $v$ bearing against the spring-blade $u$, crowding the latter against the escapement and locking that. Now, the attendant can let go of the hand $o$, as the spring in the barrel $m$ will be unable to turn the hand back to its normal position, the escapement-wheel being locked. At the same time the shutter B is open, being held open by the lever E, as in Fig. 2. The negative is now inserted, and whenever everything is in readiness for the taking of the picture the operator pulls the cord $l$. Thereby he releases the shutter C and also the spring-blade $u$ at one and the same time from the locking effect of the lever F. As a result the shutter C will instantly fly open and the hand $o$ will at the same moment begin to turn back, under the influence of the spring in the barrel $m$, to what I have termed its "normal position." It will take the exact time indicated by the dial to cause the hand $o$ to reach its normal position. Just before its normal position is reached, and the pin $q$ again in contact with the lug $r$, the lug $r$ on the spindle $n$ will strike the lever E and move it from the position shown in Fig. 2 to the position shown in Fig. 3. By this movement of the lever E the shutter B will be released, and, under the influence of its spring $d$, thrown over the end of the tube A. Thus the time elapsing between the opening of the shutter C, caused by the motion of the lever F, and the closing of the shutter B, caused by the movement of the lever E, will be the time of actual exposure, and the attendant will be able by moving the pointer $o$ to the proper place on the dial to regulate with exactness and nicety the time of such exposure.

I claim—

1. The combination of the tube A on the camera with the shutter B, and the lever E, for holding said shutter open, and a rotating spindle having a lug or cam thereon engaging the lever E, and mechanism, substantially as described, for automatically moving said lever E and unlocking the shutter B, as and for the purpose specified.

2. The tube A of a photographic camera, combined with two shutters, B and C, the shutter-closing spring $d$, the shutter-opening spring $e$, and with the levers E and F and mechanism, substantially as described, for moving them, all as set forth.

3. The combination of the spindle $n$ with a spring for turning it, pointer $o$, escapement-wheel $s$, lug $r$, escapement $t$, movable blade $u$, levers E F, and shutters B C, substantially as and for the purpose herein shown and described.

4. In a photographic camera, the combination thereof with one shutter, C, and mechanism for holding it closed, with another shutter, B, and mechanism for holding it open, and with a time-piece for regulating the period of time which elapses between the opening of the shutter C and the closing of the shutter B, as specified.

EDMOND KUHN.

Witnesses:
GUSTAV SCHNEPPÉ,
CHARLES G. M. THOMAS.